(12) United States Patent
Allott et al.

(10) Patent No.: US 8,501,003 B2
(45) Date of Patent: Aug. 6, 2013

(54) CANISTER FILTER SYSTEM WITH DRAIN THAT COOPERATES WITH FILTER ELEMENT

(75) Inventors: Mark T. Allott, Mapleton, IL (US); David Ofori-Amoah, Chicago, IL (US); Christopher J. Salvador, Peoria, IL (US); Randall W. Heibenthal, Mahomet, IL (US); Dennis M. Deedrich, Champaign, IL (US); David B. Harder, Burnsville, MN (US); John R. Hacker, Minneapolis, MN (US); Richard J. Eisenmenger, Philo, IL (US)

(73) Assignee: Caterpillar Inc., Peoria, IL (US)

( * ) Notice: Subject to any disclaimer, the term of this patent is extended or adjusted under 35 U.S.C. 154(b) by 229 days.

(21) Appl. No.: 12/896,555

(22) Filed: Oct. 1, 2010

(65) Prior Publication Data

US 2011/0073537 A1 Mar. 31, 2011

Related U.S. Application Data

(63) Continuation-in-part of application No. 11/873,489, filed on Oct. 17, 2007, now Pat. No. 8,157,997.

(51) Int. Cl.
| | |
|---|---|
| *F02M 37/22* | (2006.01) |
| *B01D 35/30* | (2006.01) |
| *B01D 29/00* | (2006.01) |
| *B01D 27/00* | (2006.01) |
| *B01D 35/00* | (2006.01) |
| *B01D 27/06* | (2006.01) |

(52) U.S. Cl.
USPC ........... 210/248; 210/232; 210/435; 210/440; 210/443; 210/445; 210/450; 210/451; 210/455; 210/493.2

(58) Field of Classification Search
USPC .............................. 210/437, 440, 457, 493.2
See application file for complete search history.

(56) References Cited

U.S. PATENT DOCUMENTS

| | | | |
|---|---|---|---|
| 2,621,796 | A | 12/1952 | Wilkinson |
| 3,166,498 | A | 1/1965 | Otto, Jr. |
| 3,224,591 | A | 12/1965 | Sawyer |
| 3,369,666 | A | 2/1968 | Hultgren et al. |
| 4,172,795 | A | 10/1979 | Kurtz et al. |

(Continued)

FOREIGN PATENT DOCUMENTS

| | | |
|---|---|---|
| DE | 1933283 | 1/1971 |
| DE | 4124322 | 1/1995 |

(Continued)

OTHER PUBLICATIONS

English Abstract for DE-4124322 A1 from esp@cenet database (1 page), 1993.

(Continued)

*Primary Examiner* — Benjamin Kurtz
(74) *Attorney, Agent, or Firm* — Finnegan, Henderson, Farabow, Garrett & dunner LLP

(57) ABSTRACT

A filter element disclosed herein includes a center tube defining a central reservoir and including an interior sidewall. The filter element further includes an end plate and a pocket defining a port extending from the end plate into the central reservoir. The pocket includes an inner wall, an outer wall, and a plurality of projections extending from the outer wall of the pocket toward the interior sidewall of the center tube.

23 Claims, 5 Drawing Sheets

U.S. PATENT DOCUMENTS

| | | | |
|---|---|---|---|
| 4,298,465 A | 11/1981 | Druffel | |
| 4,502,956 A | 3/1985 | Wilson et al. | |
| 4,721,563 A | 1/1988 | Rosaen | |
| 4,906,365 A | 3/1990 | Baumann et al. | |
| 4,948,503 A | 8/1990 | Baumann et al. | |
| 5,035,797 A | 7/1991 | Janik | |
| 5,098,559 A | 3/1992 | Mack et al. | |
| 5,203,994 A | 4/1993 | Janik | |
| 5,300,223 A | 4/1994 | Wright | |
| 5,302,284 A | 4/1994 | Zeiner et al. | |
| 5,312,546 A | 5/1994 | Janik | |
| 5,342,519 A | 8/1994 | Friedmann et al. | |
| 5,366,400 A | 11/1994 | Kucik | |
| 5,374,355 A | 12/1994 | Habiger et al. | |
| 5,458,767 A | 10/1995 | Stone | |
| 5,474,676 A | 12/1995 | Janik et al. | |
| 5,484,527 A | 1/1996 | Janik et al. | |
| 5,489,384 A | 2/1996 | Janik et al. | |
| 5,525,225 A | 6/1996 | Janik et al. | |
| 5,538,626 A | 7/1996 | Baumann | |
| 5,548,893 A | 8/1996 | Koelfgen | |
| 5,578,221 A | 11/1996 | Janik | |
| 5,584,987 A | 12/1996 | Mules | |
| 5,660,726 A | 8/1997 | Dluzik | |
| 5,660,729 A | 8/1997 | Baumann | |
| 5,660,771 A | 8/1997 | Dunfee et al. | |
| 5,685,985 A | 11/1997 | Brown et al. | |
| 5,688,396 A | 11/1997 | Baumann et al. | |
| 5,695,633 A | 12/1997 | Ernst et al. | |
| 5,698,098 A | 12/1997 | Ernst et al. | |
| 5,702,602 A | 12/1997 | Brown et al. | |
| 5,718,825 A | 2/1998 | Greive et al. | |
| 5,738,785 A | 4/1998 | Brown et al. | |
| 5,753,116 A | 5/1998 | Baumann et al. | |
| 5,753,120 A | 5/1998 | Clausen et al. | |
| 5,770,054 A | 6/1998 | Ardes | |
| 5,770,065 A | 6/1998 | Popoff et al. | |
| 5,772,881 A | 6/1998 | Stockhowe et al. | |
| 5,779,903 A | 7/1998 | Smith et al. | |
| 5,785,850 A | 7/1998 | Lynch et al. | |
| 5,817,232 A | 10/1998 | Roll et al. | |
| 5,858,227 A | 1/1999 | Stone et al. | |
| 5,888,383 A | 3/1999 | Cox | |
| 5,904,844 A | 5/1999 | Stone | |
| 5,922,196 A | 7/1999 | Baumann | |
| 5,922,199 A | 7/1999 | Hodgkins | |
| 5,928,511 A | 7/1999 | Messner et al. | |
| 5,935,481 A | 8/1999 | Dunfee et al. | |
| 5,972,210 A | 10/1999 | Munkel | |
| 6,015,492 A | 1/2000 | Popoff et al. | |
| 6,016,923 A | 1/2000 | Baumann | |
| 6,045,693 A | 4/2000 | Miller et al. | |
| 6,058,899 A | 5/2000 | Schetter | |
| 6,068,762 A | 5/2000 | Popoff et al. | |
| 6,090,283 A | 7/2000 | Schumann et al. | |
| 6,113,781 A | 9/2000 | Stone et al. | |
| 6,173,859 B1 | 1/2001 | Schumann et al. | |
| 6,174,438 B1 | 1/2001 | Hodgkins et al. | |
| 6,177,003 B1 | 1/2001 | Jainek et al. | |
| 6,187,191 B1 | 2/2001 | Koivula et al. | |
| 6,224,758 B1 | 5/2001 | Jainek et al. | |
| 6,227,381 B1 | 5/2001 | Koivula | |
| 6,248,236 B1 | 6/2001 | Hodgkins | |
| 6,322,697 B1 | 11/2001 | Hacker et al. | |
| 6,471,070 B2 | 10/2002 | Janik | |
| 6,485,637 B2 | 11/2002 | Bauer | |
| 6,506,302 B2 | 1/2003 | Janik | |
| 6,514,404 B1 | 2/2003 | Bauer | |
| 6,517,710 B2 | 2/2003 | Hartmann et al. | |
| 6,554,140 B2 | 4/2003 | Steger, Jr. et al. | |
| 6,569,326 B1 * | 5/2003 | Baumann et al. | 210/232 |
| 6,579,448 B2 | 6/2003 | Pavlin et al. | |
| 6,591,807 B1 | 7/2003 | Ardes | |
| 6,605,210 B2 | 8/2003 | Reinhardt | |
| 6,607,665 B2 | 8/2003 | Fick et al. | |
| 6,610,203 B1 | 8/2003 | Baumann et al. | |
| 6,626,299 B1 | 9/2003 | Brown et al. | |
| 6,685,829 B1 | 2/2004 | Baumann et al. | |
| 6,709,588 B2 | 3/2004 | Pavlin et al. | |
| 6,729,477 B2 | 5/2004 | Yates | |
| 6,740,234 B1 | 5/2004 | Williams et al. | |
| 6,972,092 B1 | 12/2005 | Roll | |
| 6,974,539 B1 | 12/2005 | McKenzie | |
| 2002/0158006 A1 | 10/2002 | Thomas | |
| 2003/0098269 A1 | 5/2003 | Ardes | |
| 2003/0226790 A1 | 12/2003 | Brown et al. | |
| 2003/0226800 A1 | 12/2003 | Brown et al. | |
| 2005/0103692 A1 * | 5/2005 | Stanhope et al. | 210/130 |
| 2006/0091064 A1 | 5/2006 | Brown et al. | |
| 2006/0096934 A1 | 5/2006 | Weinberger et al. | |
| 2006/0118476 A1 | 6/2006 | Weindorf et al. | |
| 2007/0181481 A1 | 8/2007 | Reynolds et al. | |
| 2008/0308481 A1 | 12/2008 | Wieczorek et al. | |
| 2010/0032359 A1 | 2/2010 | Gillenberg et al. | |
| 2010/0170842 A1 | 7/2010 | Knickmann et al. | |

FOREIGN PATENT DOCUMENTS

| | | |
|---|---|---|
| DE | 202008013578 | 3/2009 |
| EP | 0844012 | 5/1998 |
| EP | 1009512 | 6/2000 |
| EP | 2107928 | 5/2010 |
| FR | 2762230 | 10/1998 |
| JP | 57-112071 | 7/1982 |
| JP | 57112071 | 7/1982 |
| JP | 09 173716 | 7/1994 |
| JP | 7-10407 | 2/1995 |
| JP | 710407 | 2/1995 |
| JP | 09173716 | 8/1997 |
| JP | 11104408 | 4/1999 |
| WO | 2007/094978 | 8/2007 |
| WO | WO-2008/157597 | 12/2008 |

OTHER PUBLICATIONS

Illustration of Fluid Filter (1 page), 2008.
Specification Data Sheet for Baldwin Filters, 2004 (2 pages).
Office Action mailed Apr. 26, 2012, in Russian Patent Application No. 2010119507.
EPO Examination Report dated Feb. 26, 2010 in European Patent Application No. 08 839 211.3.
EPO Examination Report dated May 11, 2010 in European Patent Application No. 08 839 211.3.
EPO Examination Report dated Apr. 27, 2012 in European Patent Application No. 08 839 211.3.
Office Action dated Mar. 24, 2011 in Chinese Patent Application No. 200880010539.8.
Office Action dated Jun. 13, 2012 in Chinese Patent Application No. 200880010539.8.
Final Office Action mailed Dec. 7, 2012 in U.S. Appl. No. 13/235,306.
Office Action mailed Sep. 13, 2012 in U.S. Appl. No. 13/235,332.

* cited by examiner

CANISTER FILTER SYSTEM WITH DRAIN THAT COOPERATES WITH FILTER ELEMENT

CROSS REFERENCE TO RELATED APPLICATION

This application is a continuation-in-part of U.S. patent application Ser. No. 11/873,489 filed on Oct. 17, 2007, still pending.

TECHNICAL FIELD

The field of this disclosure is filter systems. More specifically, the field is canister filter systems for liquids, such as lube oil or liquid fuels, which have drains for draining liquid out of the canister.

BACKGROUND

Canister filter systems are used extensively today on equipment such as internal combustion engines, construction and mining machinery, and many other types of industrial machinery. They are used to filter contaminants from fluids in fuel systems, lubrication oil systems, hydraulic fluid power systems, hydraulic fluid control systems, transmission fluid systems, engine air intake systems, and the like.

A canister filter system typically includes a base which is often attached to the equipment, a canister (also sometimes called a housing, cup, can, or cover), and a filter element which is removably positioned inside the canister. After the filter element is positioned inside the canister, the canister is attached to the base with threads or other attachment means to form a sealed compartment around the filter element. The canister, base, and filter element cooperate to define fluid pathways through which fluid is directed through the filter element. The filter element contains filter media which traps and collects contaminants as the fluid passes through it. The trapped contaminants may include dirt, water, soot, ash, metallic particles, and other harmful debris.

Eventually these contaminants clog the filter media and reduce its effectiveness. Or other conditions can develop over time which also reduce the effectiveness of the filter media in removing contaminants. When this occurs, the filter element should be replaced (or possibly cleaned, but this is impractical for most applications). But only the filter element needs to be replaced, while the canister, base, and other components are reused. The filter element is designed to be conveniently replaced and readily disposed. The filter element can be replaced on demand, i.e. when the filter becomes clogged and requires replacement, or periodically, according to the guidance of a periodic maintenance schedule established for the particular application.

Canister filter systems can have many advantages over other filter systems such as spin-on filters. For instance, canister filter systems can be relatively inexpensively provided with a drain. To avoid spills, a technician may wish to remove the fluid from the canister in a controlled and contained manner before detaching the canister to replace the filter element. The drain facilitates the removal of fluid that is inside the canister. In some circumstances the fluid can spill if it is not first removed from the canister before detaching the canister from the base. The drain is typically integrated into the canister. Because in a canister filter system the drain generally increases just the cost of the canister, which is reused and purchased only once, and generally does not increase the cost of the filter element, which is frequently replaced and purchased many times, the additional cost of including a drain does not significantly increase the total operating cost to the equipment owner.

U.S. Pat. No. 6,814,243, granted Nov. 9, 2004, ("the '243 patent") is an example of prior art canister filter systems incorporating a drain in the canister. FIG. 1 of the '243 patent illustrates a canister 14 with an integrated drain (the drain is not labeled with a reference character, but is shown incorporated into the bottom of canister 14 in FIG. 1, and is shown in a closed position).

The '243 patent is also an example of another, increasingly important feature of canister filter systems. The arrangement of the filter system described in the '243 patent makes it impossible to install the canister to the base, without first having a filter element properly installed in the canister. This prevents, for example, accidentally or intentionally running the machinery without the filter element in place. As components such as fuel pumps, fuel injectors, hydraulic pumps, valves, bearings, engines, etc., become more expensive, more high tech, and are made with tighter tolerances and specifications, it is increasingly important to protect these components against contamination. Contamination may cause premature wear and even failure, and the problem is compounded when the component has tight tolerances between parts or is very expensive. Thus, it may be very advantageous in some applications to ensure that a technician does not accidentally or intentionally try to run machinery without an appropriate filter element in place.

However, while the filter system of the '243 patent performs well in some applications, it may suffer from several disadvantages, or is otherwise not well suited for other applications. For instance, the filter system of the '243 patent may not be well suited for applications where the fluid in the canister is at a high pressure. Because the connection of the canister to the base is through the filter element, the force of high pressure in the canister is reacted through the filter element, which may not be strong enough for the pressures of some applications. Additionally, O-ring between the canister and base is not intended to hold high pressure inside of the canister.

The presence of threads in the filter element's center tube can be a disadvantage in some circumstances. The threads in the center tube, which are used to connect the filter element and canister to the base, are located in the clean fluid pathway out of the system. Threads in the clean fluid pathway may contribute to contamination.

In addition, the canister of the system described in the '243 patent can be relatively complicated and expensive to manufacture for some applications. The connection structure incorporated into the bottom of the canister may add too much cost for some applications.

Because of these drawbacks, another canister filter design is needed which still prevents accidentally or intentionally using the filter system without a filter element installed, but is also relieved of some or all of the disadvantages exhibited by the '243 patent.

SUMMARY

A filter element disclosed herein includes a center tube defining a central reservoir and including an interior sidewall. The filter element further includes an end plate and a pocket defining a port extending from the end plate into the central reservoir. The pocket includes an inner wall, an outer wall, and a plurality of projections extending from the outer wall of the pocket toward the interior sidewall of the center tube.

Another filter element disclosed herein includes a center tube defining a central reservoir, a first end plate, a seal circumferentially formed around the first end plate, the seal being configured to engage a canister. The filter element further includes a second end plate opposite the first end plate and a pocket defining a port extending from the second end plate into the central reservoir. The pocket includes an inner wall having threads configured to bring the seal into engagement with the canister upon receiving a mutually threaded drain.

A filter system disclosed herein includes a filter element including a pocket. The filter system further includes a drain including a middle portion having a stop and an end portion configured for insertion into the pocket of the filter element.

Another filter system disclosed herein includes a canister including an open end and a closed end, a drain having threads and engaging the closed end of the canister, and a filter element comprising a center tube defining a central reservoir. The filter element further includes a first end plate, a seal circumferentially formed around the first end plate, a second end plate opposite the first end plate, and a pocket defining a port extending from the second end plate into the central reservoir. The pocket includes an inner wall having threads configured for mutual engagement with the threads of the drain. The drain has a closed position in which the threads of the drain mutually engage the threads of the inner wall and the seal engages the open end of the canister.

DETAILED DESCRIPTION

Figure 1:
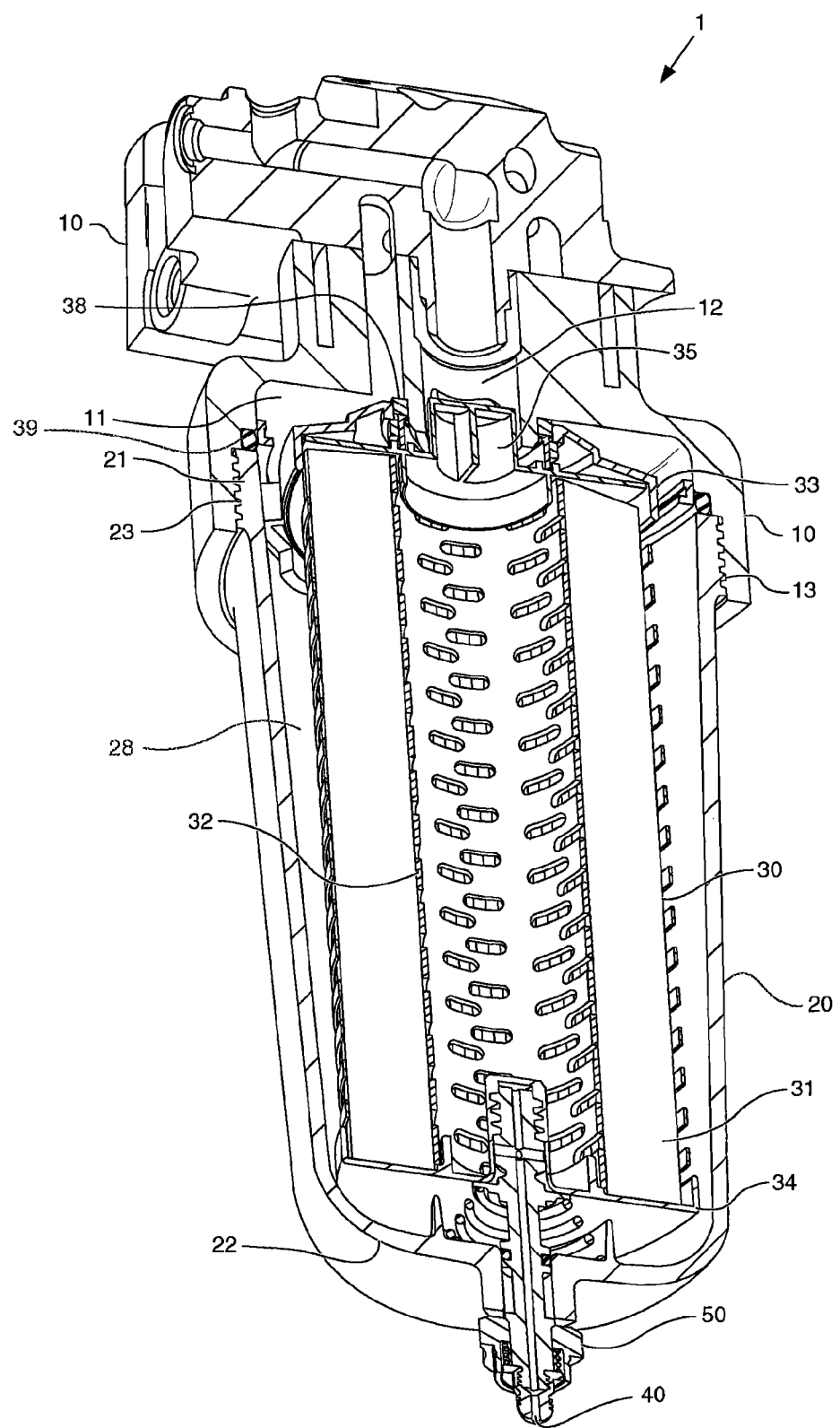
FIG. 1 is a cut away view of a canister filter system, including a base, a canister, and filter element.

The following is a detailed description of exemplary embodiments of the invention. The exemplary embodiments described herein and illustrated in the drawing figures are intended to teach the principles of the invention, enabling those of ordinary skill in this art to make and use the invention in many different environments and for many different applications. The exemplary embodiments should not be considered as a limiting description of the scope of patent protection. The scope of patent protection shall be defined by the appended claims, and is intended to be broader than the specific embodiments described herein.

FIG. 1 illustrates a canister filter system 1 having a base 10, a canister 20, and a filter element 30. The general construction and use of a canister filter system is understood by those of ordinary skill in this art. Thus, all the details of the construction and use of canister filter system 1 need not be explained here. The canister filter system 1 may be used to filter fluids such as diesel or gasoline or other liquid fuels, lubrication oil, hydraulic fluid for hydraulic power systems, transmission fluid, or even possibly intake air for an engine. The canister filter system 1 may also be used as a fuel/water separator filter. The canister filter system 1 with the features described herein could be adapted by those of ordinary skill in this art to serve many different purposes and suit many other applications.

The base 10 includes an inlet channel 11 for fluid inlet into the canister filter system 1, and an outlet channel 12 for fluid outlet from the canister filter system 1. The base also includes base threads 13.

The canister 20 includes an open end 21 and a closed end 22. Adjacent the open end 21 are canister threads 23 which can be engaged with base threads 13 to hold the canister 20 to base 10. Threads are one example of engagement structures which may be included on the base 10 and canister 20 to form a releasable engagement. Other engagement structures may be used as will be recognized by those of ordinary skill in this art.

The filter element 30 may take many different forms to suit a particular application. In the illustrated embodiment, the filter element 30 is well suited for filtering fuel or lubrication oil. The filter element 30 may include annularly arranged filter media 31 circumferentially surrounding a central reservoir defined by center tube 32. Axial ends of filter media 31 are sealed by end plates. Open end plate 33 defines an axial open end of filter element 30. The open end plate 33 is termed "open" because it includes an opening 35 for allowing passage of fluid to outlet channel 12 from the central reservoir defined by center tube 32. Closed end plate 34 defines an axial closed end of filter element 30. The closed end plate 34 is termed "closed" because it prevents any fluid outside the filter element 30 adjacent axial end of filter media 31 from flowing unfiltered into center tube 32. Open end plate 33 and closed end plate 34 may each be joined to the center tube 32 via welding, adhesives, etc. Alternatively, several or all of center tube 32, open end plate 33, and closed end plate 34 may be constructed as unitary components.

Fluid to be filtered enters from the inlet channel 11 and flows to the annular cavity 28 between canister 20 and filter media 31. The fluid then passes into and through filter media 31, then into center tube 32 through the perforations shown therein in FIG. 1. The fluid exits center tube 32 through open end plate 33 and opening 35 into the outlet channel 12. The open end plate 33 and closed end plate 34 help define the fluid channels into and out of filter media 31, preventing any fluid from flowing directly to outlet channel 12 and bypassing filter media 31. First and second annular seals 38 and 39 may advantageously be included on filter element 30 and also help define and seal fluid passageways into and out of filter element 30. First annular seal 38 may be included on the open end plate 33 around opening 35 and adjacent the axial open end of filter element 30 to help seal the inlet channel 11 from the outlet channel 12. Second annular seal 39, larger in diameter than first annular seal 38, may be formed circumferentially around the open end plate 33 to provide the seal between canister 20 and base 10, or in other words provides a seal to prevent fluid in inlet channel 11 from leaking out of the joint between canister 20 and base 10. First and second annular seals 38, 39 may be integrally formed with open end plate 33, or attached with adhesives or other methods, as is known in this art. When first and second annular seals 38, 39 are integrally formed on or included on open end plate 33, proper replacement of these seals is assured when the filter element is replaced at proper intervals. Otherwise, a technician may fail to properly replace the seals at appropriate intervals, which could result in leakage out of the system, or leakage within the system allowing unfiltered fluid to bypass the filter element 31 and lead to contamination.

Figure 2:
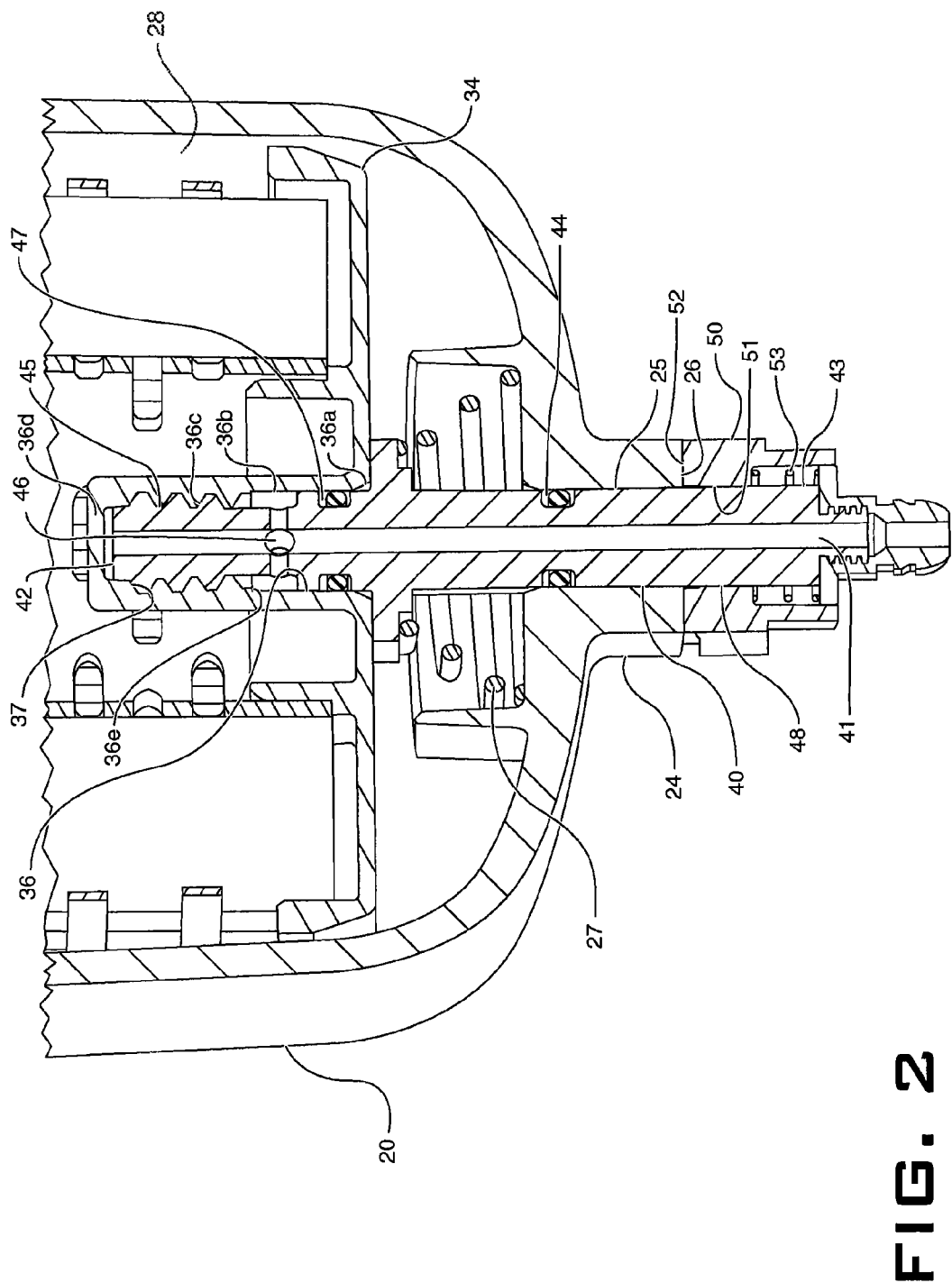
FIG. 2 is a detailed view from FIG. 1 with the drain 40 in a closed position.
Figure 3:
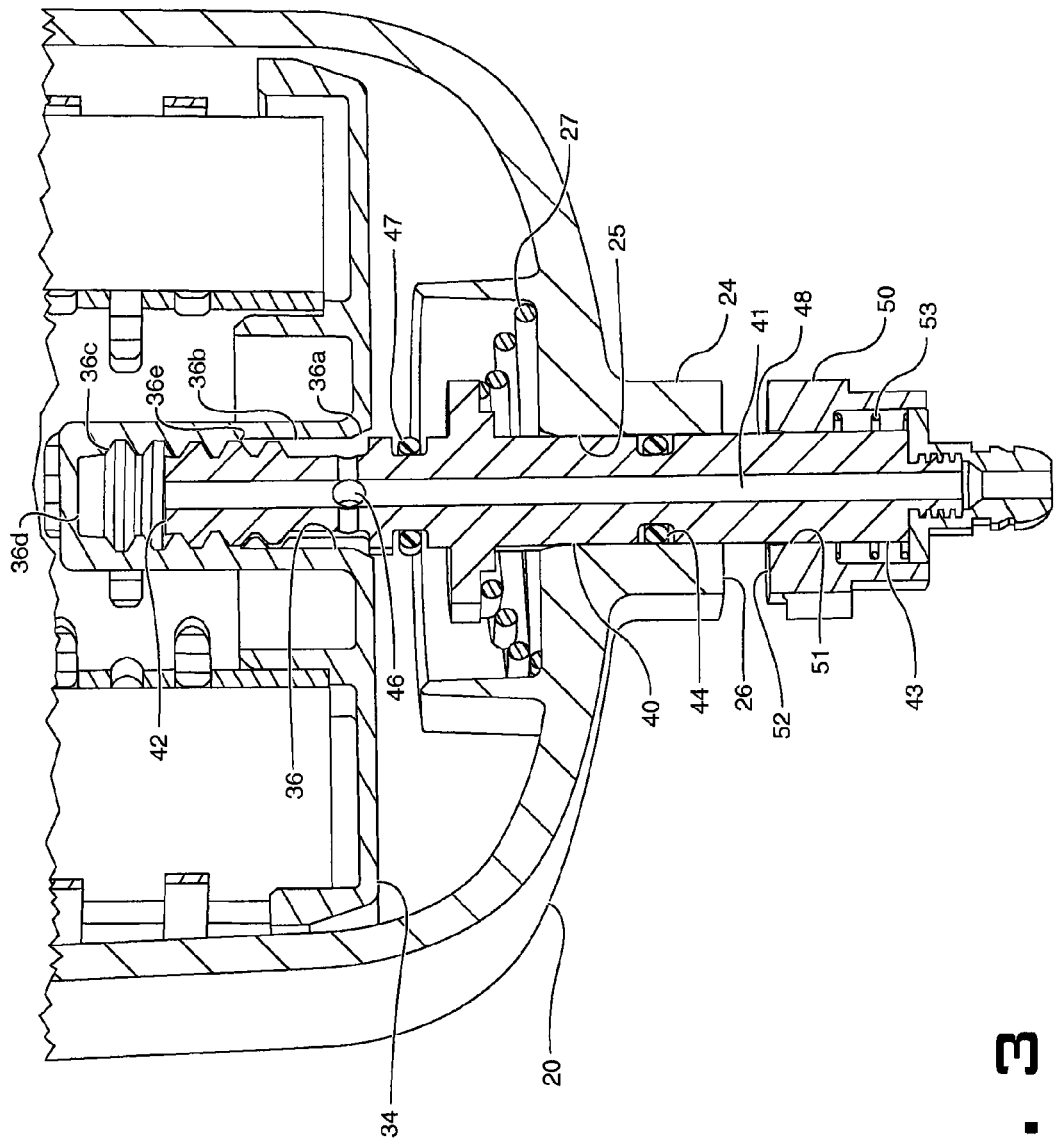
FIG. 3 is a detailed view from FIG. 1 with the drain 40 in an open position.

With reference now to FIGS. 2 and 3, a drain 40 penetrates the closed end 22 of canister 20. The drain 40 provides a drain channel 41 for removing fluid from inside of canister 20. The drain 40 is elongated and includes an inlet end 42 and an outlet end 43 connected to one another by the drain channel 41. Inlet end 42 is positioned inside of canister 20. Outlet end 43 is positioned outside of canister 20. The drain 40 may be moved between a closed position and an open position. In the closed position of FIG. 2, fluid is not able to flow through drain channel 41. In the open position of FIG. 3, fluid is able to flow from the inlet end 42, through drain channel 41, and out from outlet end 43. Drain 40 can be adapted to suit many different applications. The illustrated embodiment provides only one exemplary configuration for drain 40.

Canister 20 includes a drain boss 24 on closed end 22. Drain boss 24 protrudes out and away from closed end 22, and may include surfaces thereon that would allow a tool, such as an adjustable, open-ended wrench, to engage the drain boss 24 and turn the canister 20. Drain boss 24 forms a bore 25. Drain 40 is positioned in, and is able to slide axially and rotate in bore 25. An O-ring groove 44 is formed around the exterior of drain 40 and an O-ring is positioned therein. Alternatively, the O-ring groove may be formed on the bore 25. The O-ring prevents fluid leakage out of canister 20 through bore 25 from between drain 40 and drain boss 24.

Drain 40 may cooperate with filter element 30 to form a releasable engagement with filter element 30, and a releasable seal with filter element 30, when drain 40 is in its closed position. In the illustrated embodiment, drain 40 forms a releasable engagement with filter element 30 through engagement structure that includes a releasable threaded connection. Closed end plate 34 may form a pocket 36 in which are provided threads 37. Threads 37 are formed on an inside surface of the pocket 36. Mutual threads 45 may be formed near inlet end 42 of drain 40. Drain 40 may be engaged with filter element 30 by threading together threads 37 and 45. Threads are one example of engagement structures which may be included on the filter element 30 and drain 40 to form a releasable engagement. Other known engagement structures may be used for particular advantage in certain applications as will be recognized by those of ordinary skill in this art.

When in its closed position, with drain 40 releasably engaged with filter element 30, a releasable seal is made with filter element 30 so that practically no fluid can enter inlet end 42 of drain 40. The releasable seal is made with seal structure which, in the illustrated embodiment, includes an inlet opening 46 extending between drain channel 41 and the radial exterior of inlet end 42, and pocket 36 which receives the inlet opening 46 when the drain 40 is sealed. Putting drain 40 in its closed position moves inlet opening 46 inside of pocket 36, blocking the inlet opening 46 so that practically no fluid can enter therein. Additionally, an O-ring groove 47 may be formed on drain 40 and an O-ring positioned therein. This O-ring may provide additional protection against fluid leaking from between drain 40 and pocket 36 and entering inlet opening 46. Instead of positioning the O-ring inside of pocket 36, the O-ring could also be positioned between drain 40 and another portion of closed end plate 34, and the O-ring could be positioned in a groove formed on closed end plate 33 instead of on drain 40. When moving drain 40 to its closed position, as it advances into pocket 36, fluid trapped therein may need an escape path. This path may be provided by allowing drain channel 41 to be open through axial inlet end 42 of drain 40.

Pocket 36 includes an open end 36a, a smooth section 36b, a threaded section 36c, and a closed end 36d. Closed end 36d ensures that no fluid may flow from center tube 32 into pocket 36 and inlet opening 46, and vice versa. Threads 37 are formed in the threaded section 36c. Smooth section 36b may act as a part of the sealing structure by fitting tightly against the surfaces of drain 40 to prevent fluid from entering between and flowing from open end 36a to inlet opening 46. Smooth section 36b may also provide a surface against which the O-ring in O-ring groove 47 may seal for additional protection against fluid passage. To help maintain the smoothness of the surface of smooth section 36b, the diameter of this section may be larger than the major diameter of the threads 37, forming a lip 36e between the smooth section 36b and threaded section 36c. The larger diameter of smooth section 36b will help avoid the threads 45 on drain 40 from degrading the smooth surface used for sealing purposes.

When in an opened position, drain 40 is at least partially disengaged from filter element 30, and inlet opening 46 is open so that fluid may flow into drain channel 41. In the illustrated embodiment with a threaded engagement, putting the drain 40 in an opened position requires turning drain 40 to disengage threads 37 and 45. As threads 37 and 45 disengage, inlet end 42 of drain 40 advances out of pocket 36, unblocking inlet opening 46. Together, these features ensure that no fluid may enter inlet end 42 of drain 40 except when inlet opening 46 has backed out of pocket 36, clearing the smooth section 36b and the open end 36a. Fluid is then free to flow from inside canister 20, through inlet opening 46, through drain channel 41, and exit through outlet end 43 of drain 40.

Threads 37 and pocket 36 on filter element 30 need not necessarily be formed in closed end plate 34. The threads 37 and pocket 36 could also be formed as part of center tube 32, or some other part of filter element 30, as will be understood by those of ordinary skill in this art.

Other features and constructions may be used to provide cooperation between drain 40 and filter element 30 so that fluid cannot flow through drain 40 when drain 40 is in the closed position, and fluid may flow through drain 40 when drain 40 is in the opened position. For example, filter element 30 and drain 40 could be constructed so that drain 40 makes a releasable seal with filter element 30 to close drain 40, but the two may not be releasably engaged. Instead, as an example, the filter element 30 and drain could be independently engaged with the canister 20, and moving drain 40 to a closed position would involve drain 40 moving upward to form a releasable seal with filter element 30, but not releasably engage it.

The releasable engagement and the releasable seal between the drain 40 and the filter element 30 has several advantages. First, the engagement and/or seal ensure that a filter element 30 is placed inside canister 20 before the system can be used. A technician will not accidentally or intentionally assemble the system without a filter element 30 because without it, the drain 40 cannot be closed. Ensuring the presence of filter element 30 helps ensure that the fluid will be properly filtered.

With no threaded connections in the pathway of clean fluid from the center tube 32 to the outlet channel 12, the possibility of contamination is reduced. Threaded connections in the clean, filtered fluid pathway have been identified as a potential source of contamination. When threads are cut or formed in other ways on a metal component, or even a plastic component, a small amount of debris is often left on the threads. When the threaded connection is made, the debris may be removed through the threading action, and is then free to enter the clean fluid pathway and result in contamination of downstream components. Thus, the avoidance of threads in the clean fluid pathway eliminates this potential source of contamination.

The provision of threads on the filter element 30 provides a convenient means for repairing the threaded connection should the threads be crossed or damaged in some manner. If a threaded connection is between the canister 20 and drain 40 (as in prior art systems), either the canister 20 or the drain 40, or both, must be replaced if the threads are crossed or damaged in some other way. If threads 37 formed on filter element 30 are formed in plastic, while threads 45 on the drain 40 are formed in a harder material (possibly aluminum or another metal), when threads 37 and 45 are crossed, more than likely only threads 37 will be damaged. Threads 37 are easily replaceable by replacing the filter element 30. Finally, the engagement between the drain 40 and filter element 30 provides a means for securely holding the filter element inside the canister 20.

Holding the filter element 30 inside of canister 20 may have some advantages during installation and replacement of the filter element 30. For example, the canister 20 can be turned upside down by a technician to drain residual fluid therefrom, without the filter element 30 falling out. Also, the filter element 30 can be held in the correct position inside of canister 20 so that when the canister 20 is attached to the base 10, the filter element 30 will properly align with features on the base 10.

Other advantages may also be realized in some applications. In some applications, the manufacturing of canister 20 may be simplified because no structure for engaging the drain (e.g. threads) is needed on the canister.

Drain knob 50 facilitates turning drain 40 for moving between its closed and open positions. Drain knob 50 may be optionally positioned about drain 40 on the exterior of canister 20. Drain knob 50 includes splines 51 that mate with splines 48 formed on the exterior of drain 40. The splines 51, 48 allow drain knob 50 to move axially relative to drain 40 (along an axis parallel to the rotational axis of drain 40), but tie the two together rotationally. Turning drain knob 50 will cause a corresponding rotation of drain 40.

In addition, drain knob 50 includes camming surfaces 52 that engage with mutual camming surfaces 26 on drain boss 24. A spring 53 acts between the drain 40 and the drain knob 50, biasing the camming surfaces 52 towards engagement with the camming surfaces 26. When camming surfaces 52 and 26 engage one another, they permit the drain knob 50 to rotate relative the canister 20 in only a single direction. Camming surfaces 52 and 26 may be formed to permit rotation of drain knob 50 and drain 40 in the direction of its closed position (clockwise in the illustrated embodiment), but prohibit drain 40 to rotate in the opposite direction towards its open position unless camming surfaces 52 and 26 are disengaged. They may be disengaged by pulling drain knob 50 against the bias of spring 53, and separating the two camming surfaces 52, 26. The camming surfaces 52, 26 permit relative rotation in one direction by providing cams whereby the cams may slide by one another in one direction. The camming surfaces 52, 26 prohibit relative rotation in the other direction by providing positive stopping surfaces which interfere or clash.

A spring 27 may optionally act between drain 40 and canister 20. Spring 27 biases the drain 40 into the canister 20. This may provide advantages in inserting and removing the filter element 30. For instance, in cooperation with the drain knob 50, biasing the drain 40 upwards causes the camming surfaces 52, 26 to engage and temporarily block rotation of the drain 40 in one direction. With spring 27 positioned as shown in the figures, and with camming surfaces 52 and 26, a technician can install a replacement filter element 30 in a simple manner by holding the canister 20 with one hand, and turning the filter element 30 with the other hand to engage the filter element 30 with the drain 40.

The canister filter system 1 may be assembled by first positioning the filter element 30 inside the canister 20. The canister 20 includes an open end 21 through which the filter element 30 may pass, and a closed end 22. Next the drain 40 is caused to engage the filter element 30. The drain 40 passes through the bore 25 in the canister 20, with the inlet end 42 projecting into the canister to engage with the filter element 30. Preferably, the filter element 30 and drain 40 are first fully engaged, which simultaneously moves the drain to a closed position, before the canister 20 is finally engaged with the base 10 to complete the assembly.

With first and second annular seals 38 and 39 (see FIG. 1) integrally formed with or attached to filter element 30, many of the surfaces and seals which provide a sealing function in the system 1 will be replaced when the filter element 30 is replaced. This helps ensure the system 1 will function properly throughout its life.

Figure 4:
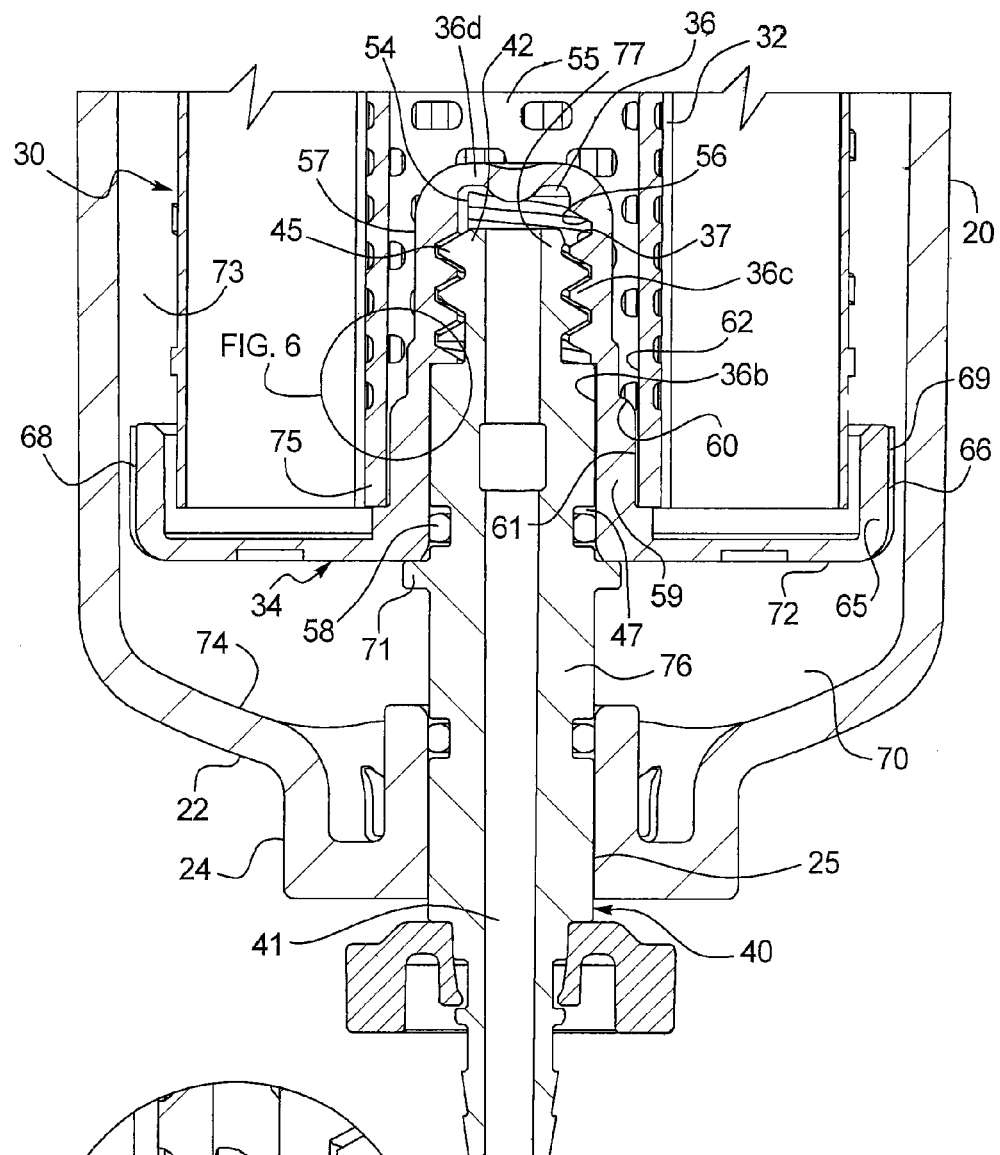
FIG. 4 is a cross-sectional view of an alternative embodiment of the filter element 30 with drain 40 shown in a closed position.
Figure 5:
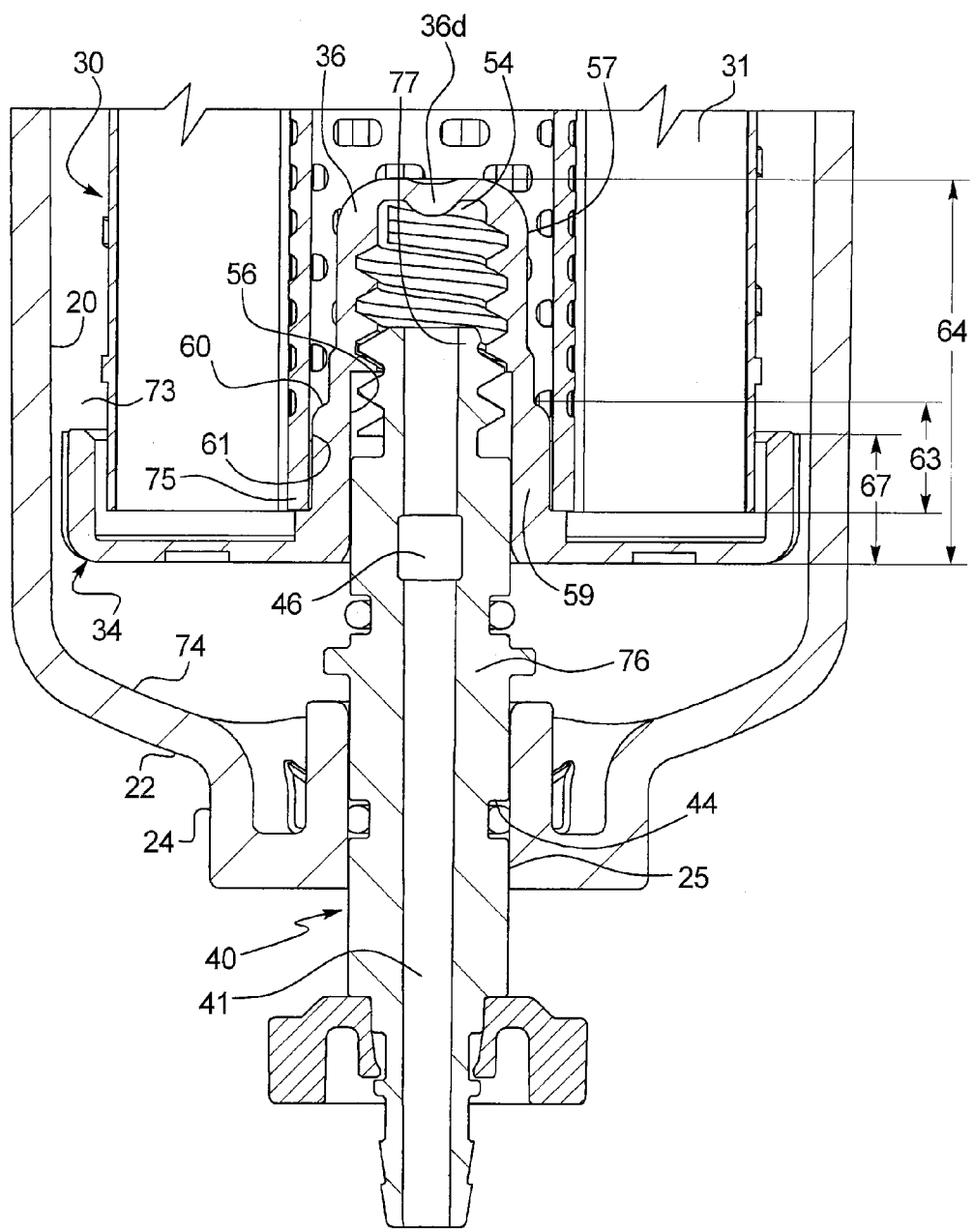
FIG. 5 is a cross-sectional view of the filter element 30 from FIG. 4 with the drain 40 shown in an open position.

FIGS. 4 and 5 illustrate an alternative embodiment of the axial closed end plate 34 of filter element 30 and of the drain 40. FIG. 4 shows this alternative embodiment when the drain 40 is in the closed position inside the pocket 36 that is disposed in the axial closed end plate 34 of filter element 30. FIG. 5 illustrates this alternative embodiment when the drain 40 is in the open position and the inlet opening 46 is generally outside of the pocket 36 of the filter element 30.

Pocket 36 defines a port 54 extending from the closed end plate 34 into central reservoir 55 of the center tube 32. The pocket 36 has an inner wall 56 and an outer wall 57. Threads 37 may be formed on a surface of the inner wall 56 of pocket 36. The threads 37 are configured to bring the second annular seal 39 of the filter element 30 into engagement with the open end 21 of the canister 20 upon receiving the mutually threaded drain 40.

A groove 47 may be formed on drain 40 and a seal 58 may be positioned therein. The seal 58 may be an O-ring in some embodiments. This O-ring 58 may provide additional protection against fluid leaking into inlet opening 46. Instead of positioning the O-ring 58 inside of pocket 36, the O-ring 58 could also be positioned between drain 40 and another portion of closed end plate 34, and the O-ring 58 could be positioned in a groove formed on closed end plate 34 instead of on drain 40. When moving drain 40 to its closed position, as it advances into pocket 36, fluid trapped therein may need an escape path. This path may be provided by allowing drain channel 41 to be open through axial inlet end 42 of drain 40.

The pocket 36 may include a plurality of projections 59 connected to the outer wall 57 of the pocket 36 and extending from the outer wall 57 toward an interior sidewall 62 of the center tube 32. The projections 59 may be any shape that extends outward from the outer wall 57 of the pocket 36. The projections 59 have a rounded shoulder 60 and an outer edge 61 that is generally adjacent to the interior sidewall 62 of the center tube 32. The outer edge 61 may be generally parallel to the interior sidewall 62 of the center tube 32, but is not limited to a parallel structure.

Figure 6:
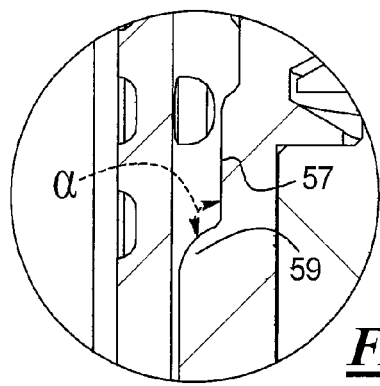
FIG. 6 is an enlarged cross-sectional view of the angle formed between a projection 59 and the outer wall of the pocket 36.

FIG. 6 illustrates an enlarged view of a portion of one of the projections 59 and the outer wall 57 of the pocket 36. As shown in FIG. 6, the projection 59 may generally form an angle α with the outer wall 57 of the pocket 36. In some embodiments, the angle α may be a right angle or an obtuse angle.

As best seen in FIG. 5, the projections 59 may be dimensioned such that the height 63 of each of the projections is less than about half the length 64 of the pocket 36. Alternatively, the projection height 63 may be more than or equal to about half of the length 64 of the pocket 36. Various different shapes and dimensions and combinations thereof for the projections 59 may be utilized. The projections 59 may be connected or affixed to the outer wall 57 of the pocket 36. Alternatively, the projections 59 may be integrally formed with the outer wall 57 or the closed end plate 34 of the filter element 30. The quantity and spacing of the projections 59 on the outer wall 57 may vary, as may the placement of the projections 59 along the length of the outer wall 57. For example, the projections 59 may be positioned on the outer wall 57 closer to the top of the pocket 36 than the bottom of the pocket 36.

The projections 59 may provide increased structural support and stability to the pocket during use in a filter system. In doing so, the projections 59 may reduce deformation of the pocket 36 and port 54 that may occur during use in high pressure applications or that may occur over time from normal wear and tear.

Reduction in such deformation also minimizes degradation in seal performance between the drain 40 and the pocket 36 resulting from deformation of the pocket 36. Such degradation may cause leaking of a closed drain or jamming of the drain 40 in the pocket 36 when an operator tries to open the drain 40 to change the filter. When a drain 40 is so jammed, operators will often try to force the seal between the drain 40 and the pocket 36 to release; this may result in the drain 40 cracking or breaking off.

The projections 59 may also reduce leaking of the filter element 30 by facilitating the correct alignment of the center tube 32 and filter media 31 on the closed end plate 34 during assembly. During assembly, the center tube 32 may be aligned on the closed end plate 34 by sliding the center tube 32 along the projections 59. The shoulders 60 of the projections 59 guide the initial positioning and movement of the center tube 32 onto or adjacent to the projection outer edges 61. The projection shoulders 60 provide for smooth alignment of the center tube 32 on the projections 59. As discussed above, in one embodiment, each projection 59 has a rounded shoulder 60. In other embodiments, the projections 59 may have other geometry such as tapered, beveled or chamfered shoulders 60.

The closed end plate 34 may include a circumferential lip 65 and a plurality of ribs 66. The lip 65 may be joined or integral to the closed end plate 34. The ribs 66 may be disposed on the outer surface 69 of the lip 65. The height 67 of each of the ribs 66 may vary with respect to the lip 65. The rib height 67 may be about the same height, shorter or longer than the lip 65. The ribs 66 may extend outward from the lip 65 and may define conduits 68 on the outer surface 69 of the lip 65. These conduits 68 may carry fluid from gap 73 between the filter element 30 and the canister 20 to the bowl 70 of the canister for removal by the drain 40. The ribs 66 may also facilitate the optimal positioning of the filter element 30 in the canister 20 and facilitate flow of fluid to the bowl 70. The rib 66 shape, quantity and spacing may vary. In one disclosed embodiment, the ribs 66 are an elongated raised ridge. Other appropriate geometry may be used that assists with even alignment of the filter element 30 in the canister 20 and provides for a fluid conduit across the lip 65. The rib height 67 may, in some embodiments, be more than half the height 63 of each of the projections 59 and in other embodiments, the rib height 67 may be less or equal to the projection height 63.

The drain 40 includes a middle portion 76 and an end portion 77. The end portion 77 of the drain 40 is configured for insertion into the pocket 36 of the filter element 30. The middle portion 76 of the drain 40 may include a stop 71. The stop 71 may be a flange or other structure extending a greater radial distance from the middle portion 76 of the drain 40 than the radial distance between the middle portion 76 of the drain 40 and the periphery of the open end 36a of the pocket 36. The stop 71 is disposed between bottom surface 72 of the closed end plate 34 and bottom internal surface 74 of the canister 20 and may be flushly received against the bottom surface 72 of the closed end plate 34. More specifically, when the drain 40 is in the closed position, the stop 71 engages the bottom surface 72 of the closed end plate 34, the end portion 44 of the drain 40 does not engage the closed end 36d of the pocket 36, and the closed end plate 34 does not engage the closed end 22 of the canister 20, including the bottom internal surface 74 thereof. Further, when the canister 20 and base 10 are fully sealed and the drain 40 is fully received in the pocket, the stop 71 may help prevent overtightening of the drain 40 by providing stopping resistance. The stop 71 may also stabilize the drain 40 in the pocket 36 during high pressure applications.

The filter element 30 may be assembled by surrounding the center tube 32 with filter media 31 and positioning a bottom end 75 of the center tube 32 over the projections 59. The center tube 32 is then slid along the length of the projections 59 until the bottom end of the center tube 32 contacts the closed end plate 34 and the pocket 36 is received in the center tube 32. The open end plate 33 is positioned on the filter media 31 and inside the center tube 32 until the open end plate 33 flushly contacts a top end of the center tube 32 and a flow path is defined from the center tube 32 through the open end plate 33 to outside the open end plate 33.

INDUSTRIAL APPLICABILITY

The canister filter system 1 may be used to filter contaminants from fluid systems including fuel systems, lubrication oil systems, hydraulic fluid power systems, hydraulic fluid control systems, transmission fluid systems, engine air intake systems, and the like, while permitting fluid to be conveniently drained using drain 40. Because of the arrangement of drain 40 with filter element 30, a technician is prevented from accidentally or intentionally operating system 1 unless a filter element 30 is in place. This operability limitation helps protect components which are sensitive to contamination.

We claim:

1. A filter element comprising:
    a center tube defining a central reservoir and including an interior sidewall;
    an end plate; and
    a pocket formed by the end plate, the pocket defining a port extending from the end plate into the central reservoir, the pocket including an inner wall, an outer wall, and a plurality of projections extending from the outer wall of the pocket toward the interior sidewall of the center tube, wherein the inner wall of the pocket includes a threaded section and a generally smooth section, wherein the smooth section is disposed below the threaded section and radially opposite the projections, and is configured to receive a sealing surface of a drain.

2. A filter element according to claim 1, wherein at least one of the projections has a rounded shoulder.

3. A filter element according to claim 1, wherein at least one of the projections generally forms an angle with the outer wall of the pocket.

4. A filter element according to claim 3, wherein the angle is an obtuse angle.

5. A filter element according to claim 1, wherein the generally smooth section is configured to receive an O-ring seal.

6. A filter element according to claim 1, wherein each of the projections includes an outer edge substantially parallel to the interior sidewall of the center tube.

7. A filter element according to claim 1, wherein the projections are integral to the outer wall of the pocket.

8. A filter element according to claim 1, wherein the end plate further includes a circumferential lip and a plurality of ribs on an outer surface of the circumferential lip.

9. A filter element according to claim 8, wherein each of the projections has a height of less than about half of a length of an outer wall of the pocket, and each of the ribs has a height of more than about half the height of each of the projections.

10. A filter element according to claim 8, wherein each of the projections has a first height, and each of the ribs has a second height less than about half of the first height.

11. A filter element according to claim 1, wherein a height of each of the projections is more than about half of a length of the outer wall of the pocket.

12. A filter element according to claim 1, wherein the port extends from a bottom surface of the end plate into the central reservoir.

13. A filter element according to claim 1, wherein at least one projection of the plurality of projections extends axially on the outer wall of the pocket along a length of the pocket.

14. A filter element according to claim 13, wherein the at least one projection is disposed between the end plate and a closed end of the pocket.

15. A filter element according to claim 1, wherein the filter element is configured to be disposed within an outer housing.

16. A filter element according to claim 1, wherein at least one projection of the plurality of projections is disposed between the interior side wall of the center tube and the outer wall of the pocket.

17. A filter element comprising:
   a center tube defining a central reservoir and including an interior sidewall;
   an end plate; and
   a pocket defining a port extending from the end plate into the central reservoir, the pocket including an inner wall extending substantially perpendicularly from the end plate, an outer wall opposite the inner wall, and a plurality of projections,
      the plurality of projections extending radially from the outer wall of the pocket toward the interior sidewall of the center tube, and axially along a portion of the pocket, wherein the inner wall of the pocket includes a threaded section and a generally smooth section, wherein the smooth section is disposed below the threaded section and opposite the projections, and is configured to receive a sealing surface of a drain.

18. A filter element according to claim 17, wherein at least one of the projections has a rounded shoulder.

19. A filter element according to claim 17, wherein the end plate further includes a circumferential lip and a plurality of ribs on an outer surface of the circumferential lip.

20. A filter element according to claim 19, wherein each of the projections has a height of less than about half of a length of an outer wall of the pocket, and each of the ribs has a height of more than about half the height of each of the projections.

21. A filter element according to claim 19, wherein each of the projections has a first height, and each of the ribs has a second height less than about half of the first height.

22. A filter element according to claim 17, wherein a height of each of the projections is more than about half of a length of the outer wall of the pocket.

23. A filter element according to claim 17, wherein the filter element is configured to be disposed within an outer housing.

* * * * *